United States Patent
Banju et al.

(10) Patent No.: US 10,933,361 B2
(45) Date of Patent: Mar. 2, 2021

(54) FILTRATION FILTER

(71) Applicant: Murata Manufacturing Co., Ltd., Nagaokakyo (JP)

(72) Inventors: Masaru Banju, Nagaokakyo (JP); Junko Watanabe, Nagaokakyo (JP); Takashi Kondo, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/127,495

(22) Filed: Sep. 11, 2018

(65) Prior Publication Data

US 2019/0009200 A1 Jan. 10, 2019

Related U.S. Application Data

(63) Continuation of application No. PCT/JP2018/007028, filed on Feb. 26, 2018.

(30) Foreign Application Priority Data

Mar. 1, 2017 (JP) ................. 2017-038579

(51) Int. Cl.
  *B01D 39/10* (2006.01)
  *C25D 1/08* (2006.01)
  *B01D 3/12* (2006.01)
  *C25D 3/12* (2006.01)

(52) U.S. Cl.
  CPC ............. *B01D 39/10* (2013.01); *C25D 1/08* (2013.01); *B01D 2239/1291* (2013.01); *C25D 3/12* (2013.01)

(58) Field of Classification Search
  CPC .. B01D 39/10; B01D 2239/1291; C25D 1/08; C25D 3/12
  See application file for complete search history.

(56) References Cited

U.S. PATENT DOCUMENTS

| | | | |
|---|---|---|---|
| 8,273,253 B2 | 9/2012 | Curran | |
| 8,317,905 B2 * | 11/2012 | Varadaraj | B01D 45/04 55/342 |
| 8,623,488 B2 | 1/2014 | Yamaguchi | |
| 10,183,083 B2 | 1/2019 | Kondo et al. | |
| 2007/0188091 A1 * | 8/2007 | Kimiya | H01J 1/46 313/506 |

(Continued)

FOREIGN PATENT DOCUMENTS

| | | |
|---|---|---|
| DE | 102005019464 A1 * 11/2006 | ......... B01D 46/2418 |
| JP | 2008180206 A 8/2008 | |

(Continued)

OTHER PUBLICATIONS

International Search Report issued for PCT/JP2018/007028, dated Apr. 10, 2018.

(Continued)

*Primary Examiner* — Waqaas Ali
(74) *Attorney, Agent, or Firm* — Arent Fox LLP

(57) ABSTRACT

A filtration filter that filters a filtration target contained in a fluid. The filtration filter includes a porous metal film having a plurality of through holes. Moreover, wave-shaped irregularities are provided in a peripheral direction along inner peripheral surfaces of the through holes of the porous metal film.

16 Claims, 4 Drawing Sheets

(56) References Cited

U.S. PATENT DOCUMENTS

| | | |
|---|---|---|
| 2009/0246453 A1 | 10/2009 | Yamaguchi |
| 2010/0143879 A1 | 6/2010 | Curran |
| 2011/0020185 A1 | 1/2011 | Vincent et al. |
| 2011/0111412 A1 | 5/2011 | Chong et al. |
| 2015/0129769 A1 | 5/2015 | Kamba et al. |
| 2017/0167025 A1 | 6/2017 | Ahn et al. |
| 2017/0173194 A1 | 6/2017 | Kondo et al. |
| 2018/0021709 A1 | 1/2018 | Yamamoto et al. |
| 2018/0207555 A1 | 7/2018 | Kondo et al. |

FOREIGN PATENT DOCUMENTS

| | | |
|---|---|---|
| JP | 2008207152 A | 9/2008 |
| JP | 2009255055 A | 11/2009 |
| JP | 2010520446 A | 6/2010 |
| JP | 2011513060 A | 4/2011 |
| JP | 2011173054 A | 9/2011 |
| JP | 2015188314 A | 11/2015 |
| WO | 2014017430 A1 | 1/2014 |
| WO | 2017026348 A1 | 2/2017 |
| WO | 2017141609 A1 | 8/2017 |
| WO | 2017141610 A1 | 8/2017 |

OTHER PUBLICATIONS

Written Opinion of the International Searching Authority for PCT/JP2018/007028, dated Apr. 10, 2018.

\* cited by examiner

FILTRATION FILTER

CROSS REFERENCE TO RELATED APPLICATIONS

The present application is a continuation of PCT/JP2018/007028 filed Feb. 26, 2018, which claims priority to Japanese Patent Application No. 2017-038579, filed Mar. 1, 2017, the entire contents of each of which are incorporated herein by reference.

TECHNICAL FIELD

The present invention relates to a filtration filter that filters a filtration target contained in a fluid.

BACKGROUND

Heretofore, for example, the filtration filter disclosed in Patent Document 1 (identified below) has been known as an example of this type of filtration filter. The filtration filter disclosed in Patent Document 1 is for separating a filtration target from a fluid sample.

CITATION LIST

Patent Document 1: Japanese Unexamined Patent Application Publication (Translation of PCT Application) No. 2010-520446.

As described below, the present inventors found that the load that acts on a filtration target passing through the through holes of a filtration filter increases when the speed (flow rate) at which the fluid passes through the through holes of the filtration filter increases. Therefore, there is still room for filtration filters of the related art to be improved from the viewpoint of reducing the load that acts on the filtration target when the filtration target passes through the through holes.

SUMMARY OF THE INVENTION

Accordingly, an object of the exemplary embodiments of the present disclosure is to provide a filtration filter that solves the above-described issue and can reduce the load that acts on a filtration target.

In order to achieve the above-described object, an aspect of the present disclosure provides a filtration filter that filters a filtration target contained in a fluid. The filtration filter includes a porous metal film in which a plurality of through holes are provided. Wave-shaped irregularities are provided in a peripheral direction along inner peripheral surfaces of the through holes of the porous metal film.

According to the exemplary embodiments of the present invention, a filtration filter can be provided that can reduce the load that acts on a filtration target.

BRIEF DESCRIPTION OF DRAWINGS

FIG. 3 is a schematic drawing in which FIG. 2 is viewed in a thickness direction.

DETAILED DESCRIPTION OF EXEMPLARY EMBODIMENTS

Figure 1:
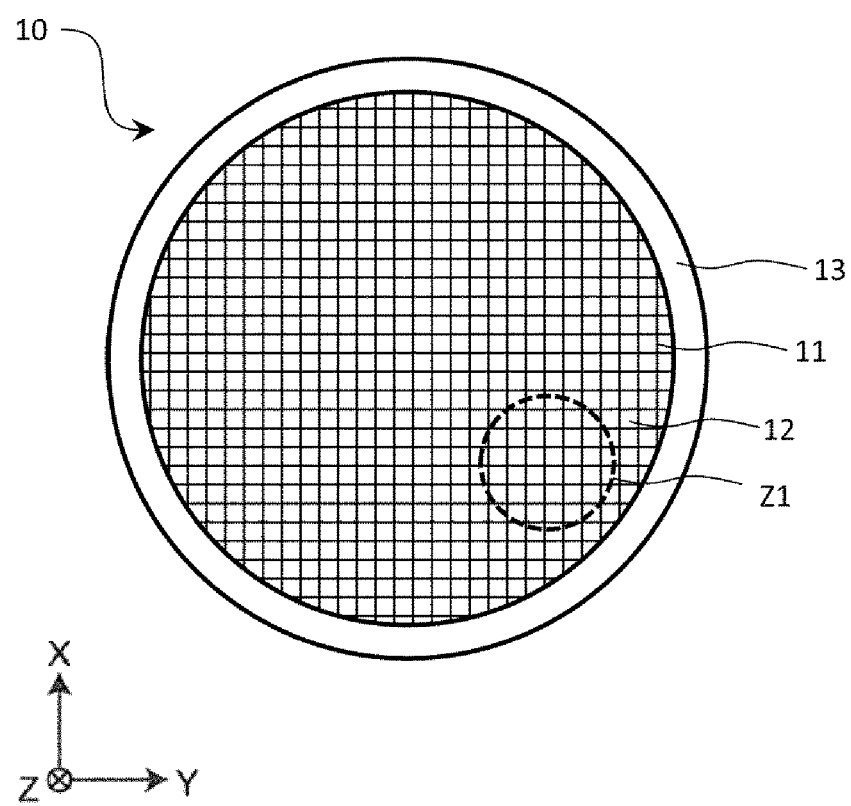
FIG. 1 is a schematic drawing of a filtration filter according to an exemplary embodiment of the present disclosure.

In general, when a fluid containing a filtration target is filtered using a filtration filter, it is beneficial to use a filtration filter having a high opening ratio in order to increase the filtration rate (amount filtered per unit time). When a plurality of through holes of a fixed size are provided in order to increase the opening ratio of the filtration filter, the through holes are densely formed over the entire filtration surface of the filtration filter by making the size of the through holes very small.

On the other hand, the speed at which a fluid passes through the through holes increases as the size of the through holes becomes smaller. The present inventors found that the load that acts on a filtration target passing through the through holes increases when the speed (flow rate) at which the fluid passes through the through holes increases.

As a result of diligent investigations based on this new knowledge, the present inventors discovered a configuration in which the surface areas of the inner peripheral surfaces of through holes provided in a filtration filter are increased by providing wave-shaped irregularities in the peripheral direction along the inner peripheral surfaces of the through holes. Thus, it was discovered that the surface resistance of the inner peripheral surfaces can be increased compared with a configuration in which such irregularities are not provided on the inner peripheral surfaces, and that the speed at which a filtration target passes through the through holes can be decreased. As a result, it was discovered that the load that acts on the filtration target passing through the through holes can be reduced while also increasing the filtration rate high by making the opening ratio high.

On the basis of these points, the present inventors created the following filtration filter to provide the technical advantages of existing filters as described herein.

An exemplary aspect of the present disclosure provides a filtration filter that filters a filtration target contained in a fluid. The filtration filter includes a porous metal film in which a plurality of through holes are provided. Wave-shaped irregularities are provided in a peripheral direction along inner peripheral surfaces of the through holes of the porous metal film.

According to the exemplary configuration, wave-shaped irregularities are provided in the peripheral direction along the inner peripheral surfaces of the through holes, and consequently the surface areas of the inner peripheral surfaces of the through holes can be increased. Consequently, the surface resistances of the inner peripheral surfaces can be increased compared with a configuration in which the irregularities are not provided on the inner peripheral surfaces, and the speed at which the filtration target passes through the through holes can be decreased. Therefore, the load that acts on the filtration target passing through the through holes can be decreased. In addition, a situation in which the filtration target adheres to the inner peripheral surfaces of the through holes can be suppressed by providing the wave-shaped irregularities in the peripheral direction along the inner peripheral surfaces of the through holes. Consequently, clogging of the through holes with the filtration target can be suppressed. In addition, when a through hole of the exemplary filtration filter does becomes clogged with the filtration target, the fluid will be able to pass along flow channels between the filtration target and the wave-shaped irregularities. Therefore, filtration efficiency can be improved.

In addition, it is preferable that the wave-shaped irregularities be formed such that ridge portions (i.e., "ridges") and valley portions (i.e., "valleys") of the irregularities alternate with each other in a repeating manner, and that the ridge portions and the valley portions extend in a flow direction of the fluid. With this configuration, since the ridge portions and the valley portions that form the wave-shaped irregularities are formed so as to extend in the flow direction of the fluid, the area of the opening of each through hole can be maintained constant from the entrance to the exit of the through hole.

In addition, it is preferable that an arrangement interval at which the ridge portions are arranged be smaller than an average particle diameter of the filtration target that passes through the through holes. With this configuration, a situation in which the filtration target enters the valley portions can be suppressed, and the area of contact between the filtration target and the inner peripheral surfaces of the through holes can be reduced. As a result, a situation in which the filtration target adheres to the inner peripheral surfaces of the through holes can be further suppressed.

Furthermore, it is preferable that irregularities be provided on the surfaces of the ridge portions and the valley portions. With this configuration, the surface resistance of the inner peripheral surfaces can be further increased, and the speed at which the filtration target passes through the through holes can be further reduced. In addition, the area of contact between the surfaces of the ridge portions and the valley portions and the filtration target can be reduced, and a situation in which the filtration target adheres to the inner peripheral surfaces of the through holes can be further suppressed. Furthermore, even in the case where a through hole becomes clogged with the filtration target and the filtration target sticks to the wave-shaped irregularities, the fluid is able to pass along flow channels between the filtration target and the irregularities.

Hereafter, an embodiment of the present invention will be described in detail while referring to the drawings.

Exemplary Embodiment

Figure 2:
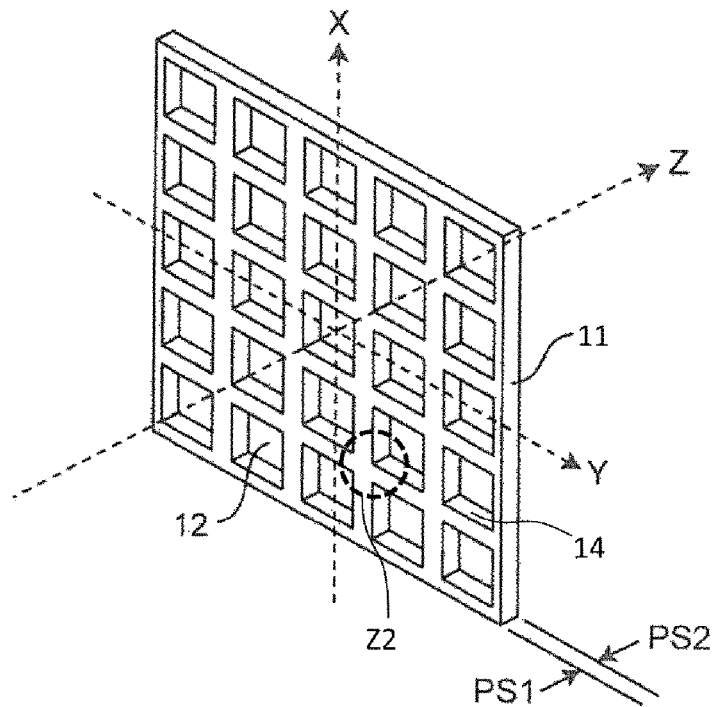
FIG. 2 is enlarged perspective view of a Z1 part of the filtration filter in FIG. 1.
Figure 3:
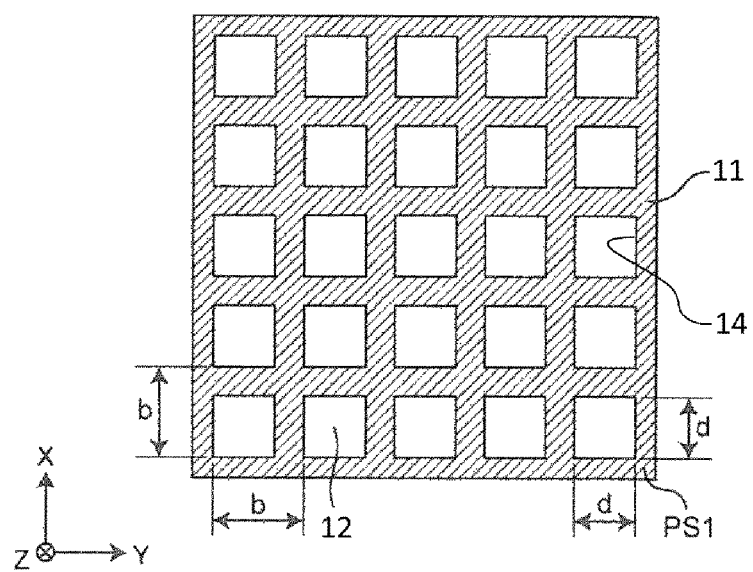

The configuration of a filtration filter according to an exemplary embodiment will be described. FIG. 1 is a schematic drawing of a filtration filter 10 according to this exemplary embodiment of the present disclosure. FIG. 2 is enlarged perspective view of a Z1 part of the filtration filter 10 in FIG. 1. FIG. 3 is a schematic drawing in which FIG. 2 is viewed in a thickness direction. The X, Y, and Z directions in FIGS. 1 to 3 respectively indicate a vertical direction, a horizontal direction, and a thickness direction of the filtration filter 10, and are directions that are perpendicular to one another.

As illustrated in FIG. 1, the filtration filter 10 includes a porous metal film 11 and a frame portion 13 (i.e., a "frame") that is provided around the outer periphery of the porous metal film 11. As illustrated in FIG. 2, the porous metal film 11 of the filtration filter 10 has a first main surface PS1 and a second main surface PS2, which face each other.

The frame portion 13, which is provided along the outer periphery of the porous metal film 11, holds the porous metal film 11. The frame portion 13 has an annular shape when seen from the main surface PS1 side of the porous metal film 11, for example. In addition, it is noted that the filtration filter 10 may not be provided with the frame portion 13 and instead the porous metal film 11 may be instead held by another member according to an exemplary aspect.

As shown, a plurality of through holes 12 that penetrate between the main surfaces PS1 and PS2 are formed in the porous metal film 11. The through holes 12 are for separating a filtration target from a fluid. The shape and dimensions of the through holes 12 are appropriately set in accordance with the shape and size of the filtration target. The through holes 12 are arranged at regular intervals or periodically, for example. Each through hole 12 has a square shape when seen from the main surface PS1 side of the porous metal film 11, for example. In this embodiment, as illustrated in FIG. 3, the through holes 12 are arrayed in a square grid pattern. One edge d of each through hole 12 is 0.1-500 μm in the vertical direction and 0.1-500 μm in the horizontal direction, for example. An interval b between the through holes 12 is larger than the dimension of each through hole 12 and less than or equal to ten times the dimension of the through hole 12, and is more preferably less than or equal to three times the dimension of the through hole 12. In addition, an opening ratio of the through holes 12 of the porous metal film 11 is greater than or equal to 10%, for example.

Examples of the material of the porous metal film 11 include gold, silver, copper, platinum, nickel, stainless steel, steel, palladium, titanium, cobalt, alloys of any of these metals, and oxides of any of these metals. The dimensions of the porous metal film 11 are a diameter of 8 mm and a thickness of 0.1-100 μm, for example. The outer shape of the porous metal film 11 is a circle, an ellipse, or a polygon, for example. In this embodiment, the outer shape of the porous metal film 11 is a circle.

Figure 4:
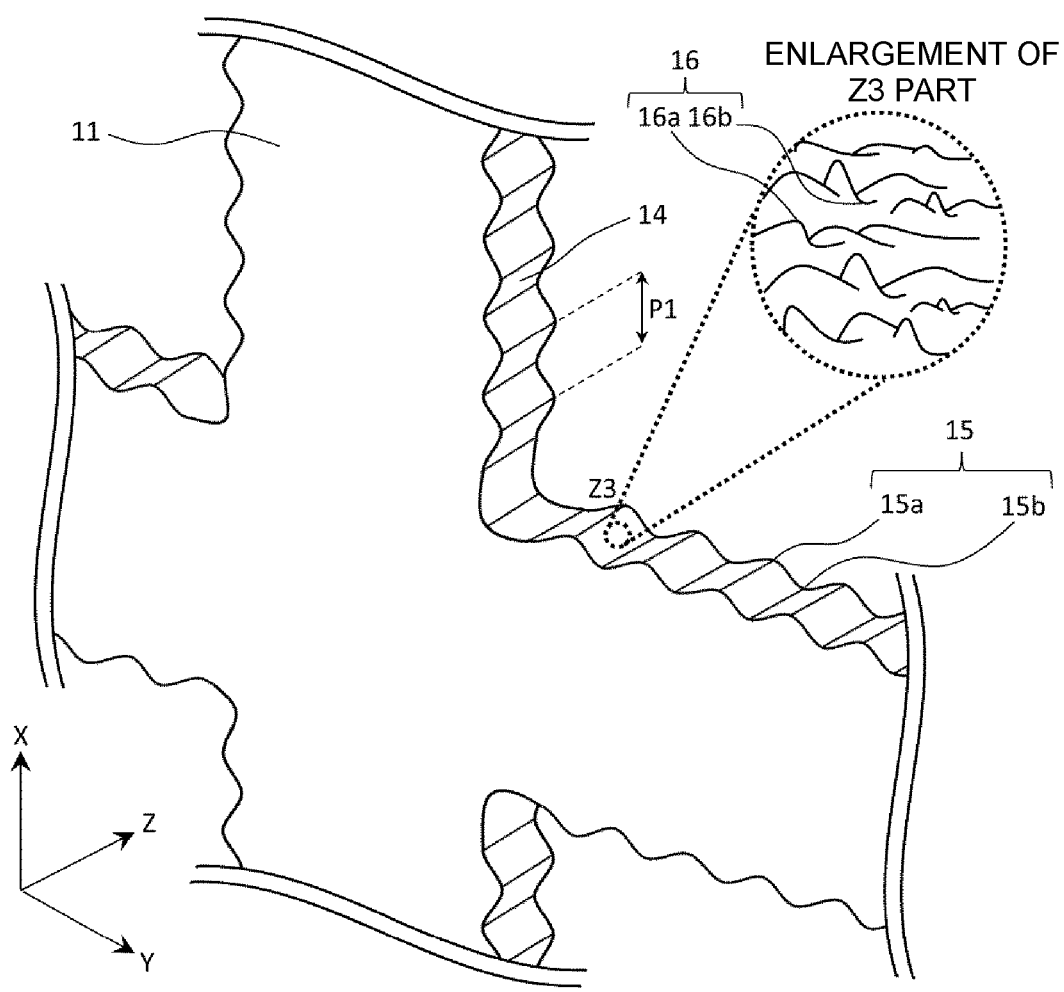
FIG. 4 is a schematic drawing of an enlargement of a Z2 part in FIG. 2.

FIG. 4 is a schematic drawing of an enlargement of a Z2 part in FIG. 2. As illustrated in FIG. 4, wave-shaped (curtain-shaped) irregularities 15 are provided in a peripheral direction along inner peripheral surfaces 14 of the through holes 12 of the porous metal film 11. In this embodiment, the wave-shaped irregularities 15 are formed so as to a smooth shape (for example, a sine curve). In addition, the wave-shaped irregularities 15 are formed such that a ridge shape 15a and a valley portion 15b of the irregularities alternate with each other in a repeating manner. The ridge portions 15a and the valley portions 15b are formed such that ridgelines thereof extend in a flow direction of the fluid. In this exemplary aspect, the flow direction of the fluid is a direction that is perpendicular to the main surfaces PS1 and PS2 of the porous metal film 11 (Z direction), and the ridge portions 15a and the valley portions 15b are formed so as to extend in the Z direction. In addition, as illustrated in the enlargement of a Z3 part in FIG. 4, irregularities 16 are provided on the surfaces of the ridge portions 15a and the valley portions 15b. The irregularities 16 have much finer shapes than the wave-shaped irregularities 15, and are formed of a plurality of protrusions 16a and recesses 16b. In addition, in this embodiment, an arrangement interval P1 at which the ridge portions 15a are arranged is preferably set so as to be smaller than the average particle diameter of the filtration target that passes through the through holes 12.

It is noted that according to the exemplary embodiment, the filtration target is a biological product contained in a liquid. As described herein, the term "biological product" refers to a substance that originates from a living being such as a cell (eucaryote), a bacterium (eubacterium), or a virus. Examples of a cell (eucaryote) include an induced pluripotent stem cell (iPS cell), ES cell, a stem cell, a mesenchymal stem cell, a monocytic cell, a single cell, a cell aggregation, a floating cell, an adhesive cell, a nerve cell, a white blood cell, a regenerative medicine cell, someone's own cell, a tumor cell, a circulating tumor cell (CTC), a HL-60 cell, a HELA cell, and a fungus. Examples of a bacterium (eubacterium) include *E. coli* and tubercule *Bacillus*. In addition, the average particle diameter of the filtration target is from 100 to 500 µm.

Moreover, according to the exemplary embodiment, the wave-shaped irregularities 15 are provided in the peripheral direction along the inner peripheral surfaces 14 of the through holes 12 of the porous metal film 11. With this configuration, the surface areas of the inner peripheral surfaces 14 of the through holes 12 can be made larger than in a configuration in which the irregularities 15 are not provided on the inner peripheral surfaces 14. Consequently, the surface resistance of the inner peripheral surfaces 14 can be increased compared with the configuration in which the irregularities 15 are not provided on the inner peripheral surfaces 14. Therefore, the speed at which the filtration target passes through the through holes 12 can be decreased. As a result, the load that acts on the filtration target passing through the through holes 12 can be reduced while maintaining the opening ratio at a high value. In addition, a situation in which the filtration target adheres to the inner peripheral surfaces 14 can be suppressed and clogging of the through holes 12 by the filtration target can be suppressed by providing the wave-shaped irregularities 15 in the peripheral direction along the inner peripheral surfaces 14 of the through holes 12. Furthermore, even in the case where a through hole 12 becomes clogged with the filtration target, the fluid is able to pass along flow channels between the filtration target and the wave-shaped irregularities 15. Therefore, filtration efficiency can be improved.

In addition, the wave-shaped irregularities 15 are formed such that the ridge portions 15a and the valley portions 15b of the irregularities 15 alternate with each other in a repeating manner, and the ridge portions 15a and the valley portions 15b are formed so as to extend in the flow direction of the fluid. With this configuration, the area of the opening of each through hole 12 can be maintained constant from the entrance to the exit of the through hole 12.

In addition, the arrangement interval P1 at which the ridge portions 15a are arranged is preferably set so as to be smaller than the average particle diameter of the filtration target that passes through the through holes 12. Furthermore, the height of the wave-shaped irregularities 15 is preferably less than or equal to 10% of the size of the through holes 12. In this embodiment, the term "height" refers to the average value of heights from the tops of the ridge portions 15a to the bottoms of valley portions 15b. With this configuration, a situation in which the filtration target enters the valley portions 15b can be suppressed, and the area of contact between the filtration target and the inner peripheral surfaces 14 can be reduced. As a result, a situation in which the filtration target adheres to the inner peripheral surfaces 14 can be further suppressed.

Furthermore, the irregularities 16 are provided on the surfaces of the ridge portions 15a and the valley portions 15b, which are provided on the inner peripheral surfaces 14. With this configuration, the surface resistance of the inner peripheral surfaces 14 can be further increased, and the speed at which the filtration target passes through the through holes 12 can be reduced. In addition, the area of contact between the filtration target and the inner peripheral surfaces 14 can be further reduced, and a situation in which the filtration target adheres to the inner peripheral surfaces 14 can be further suppressed. Furthermore, even in the case where a through hole 12 becomes clogged with the filtration target and the filtration target sticks to the wave-shaped irregularities 15, the fluid is able to pass along flow channels between the filtration target and the irregularities 16.

In a situation where the size of the through holes 12 in the porous metal film 11 is less than or equal to 50 µm, the speed at which the fluid passes through the through holes 12 becomes high, and as a result the load that acts on the filtration target passing through the through holes 12 readily increases. Therefore, in particular, reducing the speed at which the filtration target passes through the through holes 12 is even more necessary in the case where the size of the through holes 12 is less than or equal to 50 µm. From this viewpoint, the effect of this embodiment is readily obtained in the case where the average particle diameter of the filtration target is less than or equal to 50 µm.

Next, an example of a method of manufacturing the porous metal film 11 will be described. FIGS. 5A to 5E are sectional views illustrating an example of a method of manufacturing the porous metal film 11.

Figure 5A:
FIG. 5A is a sectional view schematically illustrating one step of a method of manufacturing the filtration filter of FIG. 1.

First, as illustrated in FIG. 5A, a copper thin film 22 is formed on a substrate 21 composed of silicon or the like. The copper thin film 22 can be formed using vapor deposition or sputtering, for example. Better surface film quality can be obtained when the film is formed using sputtering compared with when the film is formed using vapor deposition.

Figure 5B:
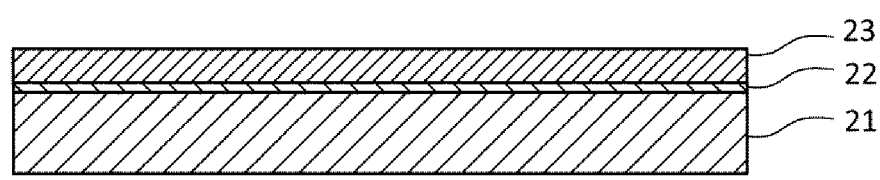
FIG. 5B is a sectional view illustrating a step subsequent to that in FIG. 5A.

Next, as illustrated in FIG. 5B, a resist film 23 is formed on the copper thin film 22. Specifically, the resist film 23 is formed by applying a resist onto the copper thin film 22 using spin coating for example, and then performing a drying treatment. The film thickness of the resist film 23 is appropriately set in accordance with the film thickness of the porous metal film 11.

Figure 5C:
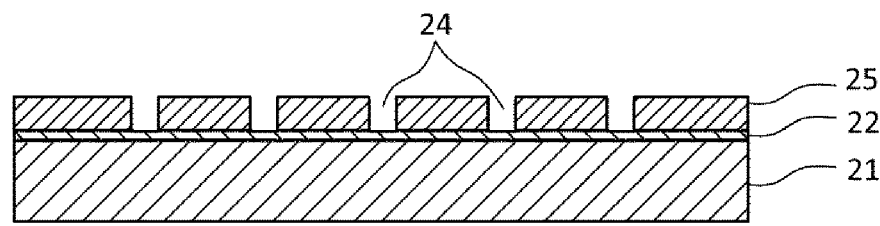
FIG. 5C is a sectional view illustrating a step subsequent to that in FIG. 5B.

Next, as illustrated in FIG. 5C, the resist film 23 is subjected to a light exposure and development treatment, and parts corresponding to the porous metal film 11 are removed from the resist film 23, and as a result a resist image 25 having grooves 24 is formed. Wave-shaped irregularities are formed in the peripheral direction along the inner peripheral surfaces of the grooves 24 by performing light exposure with a low energy density or focus offset. These wave-shaped irregularities correspond to the wave-shaped irregularities 15 on the inner peripheral surfaces 14 of the through holes 12 of the porous metal film 11.

Figure 5D:
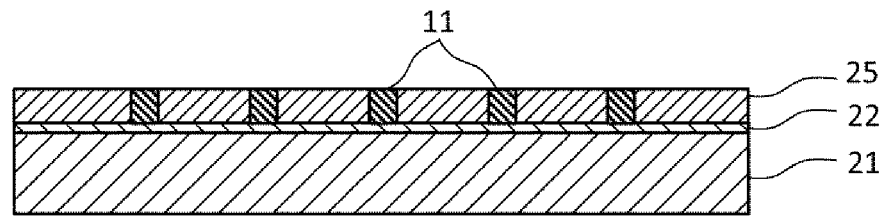
FIG. 5D is a sectional view illustrating a step subsequent that in FIG. 5C.

Next, as illustrated in FIG. 5D, the porous metal film 11 is formed in the parts where the resist film 23 has been removed. The porous metal film 11 can be formed using an electroplating method, for example, in an exemplary aspect. Typically, the plating speed is low and the plating process takes a long period of time when plating is performed using an electroplating method. In this exemplary aspect, the irregularities 16 are formed on the surfaces of the ridge portions 15a and the valley portions 15b by performing plating in a short period of time using a high plating speed.

Figure 5E:
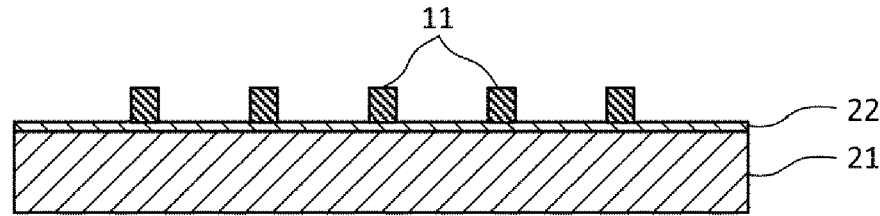
FIG. 5E is a sectional view illustrating a step subsequent to that in FIG. 5D.

Next, as illustrated in FIG. 5E, the resist image 25 is removed from the copper thin film 22 by subjecting the resist image 25 to a dissolving/peeling treatment by performing dipping in a solvent (for example, acetone).

Next, the copper thin film 22 is removed by performing etching and the porous metal film 11 is peeled off the substrate 21. Thus, the porous metal film 11 is manufactured in which the wave-shaped irregularities 15 are formed on the inner peripheral surfaces 14 of the through holes 12 and the irregularities 16 are formed on the surfaces of the ridge portions 15a and the valley portions 15b. It should be appreciated that the manufacturing method described using FIGS. 5A to 5E is an example, and other manufacturing methods may be employed.

It is further noted that the present disclosure is not specifically limited to the exemplary embodiments described herein, and the exemplary embodiments can be implemented in the form of various other modes. For example, in the exemplary embodiment, it was assumed that the porous metal film 11 is used in order to filter a biological product from a liquid, but the present invention is not limited to this example. For example, the porous metal film 11 may be used in order to concentrate a liquid.

In addition, the arrangement interval P1 of the ridge portions 15a and the valley portions 15b does not have to be constant in the peripheral direction. Furthermore, provided that the ridgelines roughly extend in the flow direction of the fluid, the interval of the ridge portions 15a and the valley portions 15b may be may be changed in the flow direction of the fluid.

Example 1

Next, description will be given of a porous metal film 11 according to example 1 that was manufactured with the manufacturing method described using FIGS. 5A to 5E.

First, the copper thin film 22 was formed on the upper surface of the silicon substrate 21 using a sputtering device. At this time, a titanium thin film was formed as intermediate layer in order to secure adhesion between the substrate 21 and the copper thin film 22. As sputtering conditions, power of DC 500 W was applied under an argon gas atmosphere with a degree of vacuum of $5.0 \times 10^4$ Pa, and sputtering was performed for 27 minutes for the copper thin film 22 and was performed for 3 minutes 5 seconds for the titanium thin film.

Next, using a spin coater, the resist film 23 having a film thickness of 2 μm was formed on the copper thin film 22 formed on the upper surface of the substrate 21. At this time, the rotational speed of the spin coater was set to 1130 rpm and the resist film 23 was formed by coating the upper surface of the copper thin film 22 with a resist agent (PFI-37A manufactured by Sumitomi Chemical Co., Ltd.), volatilizing a solvent under a nitrogen atmosphere of 130° C., and then performing cooling.

Next, the resist film 23 was exposed to light by radiating light including a wavelength of 365 nm and having an energy density of 1300 J/m² for 0.25 seconds using an aperture (NA) of 0.45 and a focus offset of +0.80 μm. At this time, the light exposure was performed by using a mask having through holes corresponding to the porous metal film 11. After that, development was realized by performing two times work of performing heating for 3 minutes under an atmosphere of 85° C. and then immersion in a developer solution (NMD-3) for 1 minute. In this way, parts corresponding to the porous metal film 11 were removed from the resist film 23.

Next, asking was performed for 1 minute at a strength of RF 200 W, and then immersion in 5% dilute sulfuric acid was performed for 60 seconds. After that, electroplating was performed with a plating speed of 0.5 μm/min while performing shaking under conditions of a liquid temperature of 55° C. and an electrical current value of 1.699 A applied to a nickel aminosulfonate plating solution with a pH of 4.0. In this way, the porous metal film 11 was formed in the parts where the resist film 23 was removed.

Next, the resist film 23 was peeled off by applying ultrasound for 15 minutes in an acetone solution.

After that, the copper thin film 22 was removed by performing etching and the porous metal film 11 was peeled off the silicon substrate 21. At this time, the porous metal film 11 was peeled off by performing immersion for 48 hours under an environment of 25° C. in an aqueous solution manufactured by mixing 60% hydrogen peroxide water, acetic acid, and pure water at a ratio of 1:1:20. In this way, the porous metal film according to example 1 was manufactured.

Example 2

Next, a porous metal film according to another example 2 will be described. In example 2, points that are different from example 1 will be described.

As conditions for exposing the resist film to light, the resist film 23 was exposed to light by radiating light including a wavelength of 365 nm and having an energy density of 2050 J/m² for 0.25 seconds using an aperture (NA) of 0.45 and a focus offset of +0.20 μm.

Comparative Example 1

Next, a porous metal film according to comparative example 1 will be described. In comparative example 1, points that are different from example 1 will be described.

As conditions for exposing the resist film to light, the resist film 23 was exposed to light by radiating light including a wavelength of 365 nm and having an energy density of 2050 J/m² for 0.25 seconds using an aperture (NA) of 0.45 and a focus offset of +0.80 μm.

In examples 1 and 2, it was observed that the wave-shaped irregularities 15 were formed on the inner peripheral surfaces 14 of the through holes 12 of the porous metal film 11, and that the irregularities 16 were formed on the surfaces of the ridge portions 15a and the valley portions 15b. In contrast, in comparative example 1, the wave-shaped irregularities 15 were not observed on the inner peripheral surfaces 14 of the through holes 12 of the porous metal film 11.

As described above, it was confirmed that the wave-shaped irregularities 15 were formed on the inner peripheral surfaces 14 of the through holes 12 of the porous metal film 11 and the irregularities 16 were formed on the surfaces of the ridge portions 15a and the valley portions 15b by setting the energy density and the focus offset so as to be small.

Although the exemplary embodiments of the present disclosure have been sufficiently described in relation to a preferred embodiment while referring to the accompanying drawings, various modifications and amendments will be evident to people skilled in the art. So long as such modifications and amendments do not depart from the scope of present invention as defined by the appended claims, such modifications and amendments are to be understood as being included in the scope of the present invention.

The exemplary embodiments of the present disclosure are able to reduce the load acting on a filtration target as compared with conventional filtration techniques, and is therefore useful in filtration filters that filter a filtration target contained in a fluid such as a biological product, PM 2.5, or the like.

REFERENCE SIGNS LIST 10 filtration filter
11 porous metal film 12 through hole
13 frame portion
14 inner peripheral surface
15 wave-shaped irregularity
15a ridge portion
15b valley portion
16 irregularities on surfaces of ridge portions and valley portions
16a protrusion
16b recess
21 substrate
22 copper thin film
23 resist film
24 groove
25 resist image
PS1 first main surface
PS2 second main surface

The invention claimed is:

1. A filtration filter for filtering a filtration target contained in a fluid, the filtration filter comprising:
   a porous metal film in which a plurality of through holes are disposed therein; and
   a plurality of wave-shaped irregularities disposed in a peripheral direction along inner peripheral surfaces of the plurality of through holes of the porous metal film,
   wherein the plurality of wave-shaped irregularities each comprise ridges and valleys that alternate with each other in a repeating manner in the peripheral direction, and
   wherein each of the plurality of wave-shaped irregularities comprises a plurality of finer shaped irregularities that are disposed on surfaces on the ridges and the valleys and that are formed of a plurality of protrusions and recess thereon.

2. The filtration filter according to claim 1, wherein the ridges and the valleys of each wave-shaped irregularity extend in a flow direction of the fluid.

3. The filtration filter according to claim 1, wherein each of the plurality of fine-shaped irregularities comprises a plurality of protrusions and recesses.

4. The filtration filter according to claim 2, wherein an area of opening of each through hole is constant from an entrance to an exit of the respective through hole.

5. The filtration filter according to claim 1, further comprising a frame disposed around an outer periphery of the porous metal film.

6. The filtration filter according to claim 1, wherein the porous metal film has a first main surface and a second main surface that face each other.

7. The filtration filter according to claim 6, further comprising a frame disposed around an outer periphery of the porous metal film and having an annular shape when seen from one of the first and second main surfaces of the porous metal film.

8. The filtration filter according to claim 6, wherein each of the plurality of through holes has a square shape when seen from one of the first and second main surfaces of the porous metal film.

9. The filtration filter according to claim 8, wherein the plurality of through holes are arrayed in a square grid pattern.

10. The filtration filter according to claim 6, wherein the ridges and valleys of the plurality of wave-shaped irregularities extend in a flow direction of the fluid that is perpendicular to the first and second main surfaces of the porous metal film.

11. The filtration filter according to claim 1, wherein the porous metal film comprises at least one of gold, silver, copper, platinum, nickel, stainless steel, steel, palladium, titanium, and cobalt.

12. The filtration filter according to claim 1, wherein the ridges and valleys of each of the plurality of wave-shaped irregularities comprise a sine-curved shape.

13. The filtration filter according to claim 1, wherein each of the ridges and valleys of each wave-shaped irregularity comprises a height that is less than or equal to 10% of a size of the respective through hole, with the height being an average value of heights from respective tops of the ridges to respective bottoms of valleys of the plurality of wave-shaped irregularities.

14. A filtration filter for filtering a filtration target contained in a fluid, the filtration filter comprising:
   a porous metal film in which a plurality of through holes are disposed therein; and
   a plurality of wave-shaped irregularities disposed in a peripheral direction along inner peripheral surfaces of the plurality of through holes of the porous metal film,
   wherein the plurality of wave-shaped irregularities each comprise ridges and valleys that alternate with each other in a repeating manner in the peripheral direction,
   wherein each of the plurality of wave-shaped irregularities comprises a plurality of finer shaped irregularities disposed on surfaces on the ridges and the valleys, and
   wherein the plurality of finer-shaped irregularities are formed or created by electroplating.

15. The filtration filter according to claim 14, wherein each of the finer shaped irregularities are formed of a plurality of protrusions and recess on the ridges and the valleys of the plurality of wave-shaped irregularities.

16. The filtration filter according to claim 14, wherein the ridges and the valleys of each wave-shaped irregularity extend in a flow direction of the fluid.

* * * * *